(12) United States Patent
Schinacher et al.

(10) Patent No.: US 9,011,290 B2
(45) Date of Patent: Apr. 21, 2015

(54) METHOD FOR OPERATING A VEHICLE DRIVE TRAIN DURING A STARTING PROCESS

(71) Applicant: ZF Friedrichshafen AG, Friedrichshafen (DE)

(72) Inventors: Stephan Schinacher, Egesheim (DE); Marcus Hiemer, Meckenbeuren (DE); Timo Maise, Flein (DE); Jan-Frederik Kuhn, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 14/065,559

(22) Filed: Oct. 29, 2013

(65) Prior Publication Data
US 2014/0148308 A1 May 29, 2014

(30) Foreign Application Priority Data

Nov. 23, 2012 (DE) .......................... 10 2012 221 477

(51) Int. Cl.
*B60W 10/02* (2006.01)
*B60W 10/06* (2006.01)
*B60W 10/10* (2012.01)
*F02N 19/00* (2010.01)
*B60W 10/103* (2012.01)
*B60W 30/18* (2012.01)

(52) U.S. Cl.
CPC .............. *F02N 19/00* (2013.01); *Y10T 477/656* (2015.01); *B60W 10/10* (2013.01); *B60W 10/06* (2013.01); *B60W 10/02* (2013.01); *B60W 10/103* (2013.01); *B60W 30/18027* (2013.01)

(58) Field of Classification Search
None
See application file for complete search history.

(56) References Cited

U.S. PATENT DOCUMENTS

| 6,030,313 | A | 2/2000 | Sawada et al. |
| 8,287,427 | B2 | 10/2012 | Sah et al. |
| 8,465,395 | B2 * | 6/2013 | Takahashi et al. ............ 477/115 |
| 2006/0089232 | A1 * | 4/2006 | Kobayashi et al. ............ 477/70 |

(Continued)

FOREIGN PATENT DOCUMENTS

| DE | 199 17 575 A1 | 10/2000 |
| DE | 698 21 557 T2 | 7/2004 |
| DE | 11 2007 002 280 T5 | 8/2009 |
| DE | 10 2010 008 787 A1 | 12/2010 |

(Continued)

OTHER PUBLICATIONS

German Search Report Corresponding to 10 2012 221 477.1 mailed Jul. 18, 2013.

*Primary Examiner* — Robert Hodge
*Assistant Examiner* — Alberto Interian, III
(74) *Attorney, Agent, or Firm* — Davis & Bujold, P.L.L.C.; Michael J. Bujold

(57) ABSTRACT

A method of operating a vehicle drive-train during a starting process. The drive-train has a drive mechanism which can couple a continuously-variable power-branched transmission in which a plurality of transmission ratios can be engaged. The transmission ratios can be varied continuously by adjusting a variator, the transmission driving a drive output. A force flow between the drive mechanism and the drive output can be produced by a frictional shifting element by appropriately adjusting the transmission capacity of the shifting element. When a start command is issued, a starting transmission ratio is engaged in the area of the transmission device. During the engagement of the starting transmission ratio the transmission capacity of the frictional shifting element is adjusted to values greater than zero.

20 Claims, 3 Drawing Sheets

(56) References Cited

U.S. PATENT DOCUMENTS

2008/0076633 A1* 3/2008 Nagai et al. .................. 477/117
2008/0312038 A1* 12/2008 Nakagawa et al. ........... 477/175
2010/0227736 A1* 9/2010 Takahashi et al. ............. 477/86

FOREIGN PATENT DOCUMENTS

DE  10 2010 040 735 A1  3/2012
GB  2 455 030 A  6/2009

* cited by examiner

METHOD FOR OPERATING A VEHICLE DRIVE TRAIN DURING A STARTING PROCESS This application claims priority from German patent application serial no. 10 2012 221 477.1 filed Nov. 23, 2012.

FIELD OF THE INVENTION

The invention concerns a method for operating a vehicle drive-train during a starting process.

BACKGROUND OF THE INVENTION

During starting processes of vehicle drive-trains constructed with conventional automatic variable-speed transmissions, when a driver wishes to start off and actuates the gas pedal there occur only slight delays which the driver can perceive only with difficulty or even not at all. With automatic variable-speed transmissions, already during the creation of the force linkage by way of a hydrodynamic torque converter, torque is provided in the area of a drive output of a vehicle drive-train. As a rule this is enabled by increasing the transmission capacity of a clutch or the like. By increasing the transmission capacity of the clutch, the rotational speed of the previously freely rotating turbine of the hydrodynamic torque converter is reduced toward zero whereby in the area of the torque converter a corresponding speed ratio is produced. The torque taken up by a pump impeller wheel of the hydrodynamic torque converter and supplied by a drive mechanism functionally connected thereto is then delivered toward the drive output by the turbine of the torque converter as a function of the torque conversion taking place in the area of the torque converter.

The amount of torque delivered by the turbine cannot exceed the torque produced by a starting element, which depends on a gear ratio between the turbine and the starting element. A vehicle constructed with such a vehicle drive-train is accelerated in accordance with the gear ratio engaged in the area of the automatic variable-speed transmission and the torque that results from the gear ratio in the area of the drive output by virtue of the interplay between the drive machine, the hydrodynamic torque converter and the starting element.

In contrast, in the case of continuously-variable power-branched transmission systems, the force flow between a drive mechanism and a drive output of a vehicle drive-train is produced in the area of one or more shifting elements and then a transmission ratio of such a transmission system is adjusted from infinite to long.

However, this procedure impairs the spontaneity of a vehicle drive-train to an undesired extent, since operating times between the moment when a driver generates a command for a starting process and the moment when the vehicle actually starts off in the desired driving direction can be quite long, and constitute time delays that are clearly perceptible by the driver.

Particularly in the case of working machines, time-delayed responses to a driver's commands are not acceptable. This applies especially to wheel loaders and forestry machines. The use of continuously-variable power-branched transmissions in vehicle drive-trains of such working machines leads to time delays, above all during starting processes.

SUMMARY OF THE INVENTION

Accordingly, the purpose of the present invention is to provide a method that can be carried out simply for operating a vehicle drive-train during a starting process, by means of which the spontaneity in relation to carrying out a driver's command for starting up a vehicle drive-train that comprises a continuously-variable power-branched transmission device can be improved by comparison with conventionally operated vehicle drive-trains.

In the method according to the invention for operating a vehicle drive-train during a starting process, the drive-train comprises a drive mechanism to which is coupled a continuously-variable power-branched transmission device that produces a plurality of transmission ranges, within which the transmission ratio can be varied continuously by adjusting a variator, and comprising also a drive output, a force flow between the drive mechanism and the drive output can be created with a frictional shifting element by appropriately adjusting the transmission capacity of the shifting element, so that when a starting command is issued a starting transmission ratio is engaged in the area of the transmission device.

According to the invention, during the engagement of the starting transmission ratio the transmission capacity of the frictional shifting element is adjusted to values greater than zero.

Since in the method according to the invention the transmission capacity of the frictional shifting element is adjusted to values greater than zero at the same time as the engagement of the starting transmission ratio, a command to start a vehicle, in this case preferably issued by a driver, can be implemented in a particularly simple manner with delays significantly reduced in comparison with procedures known from the prior art, without giving rise to any disadvantages perceptible by the driver.

To avoid overloads in the area of the frictional shifting element particularly during a starting process, in an advantageous variant of the method according to the invention, the transmission ratio of the transmission device and a drive torque applied at the frictional shifting element are varied to an extent that reduces the load on the shifting element by adjusting the variator during the starting process. This means that the transmission ratio of the transmission device is changed, for example, to shorten the duration of slipping operation of the frictional shifting element by reducing a torque applied at the frictional shifting element. For the desired production of the force flow, the frictional shifting element can be acted upon with its maximum closing pressure while it is in slip-free operation, without giving rise to any driving-comfort-impairing reaction torques in the vehicle drive-train.

When a starting command is issued, if the shifting element is pre-filled by applying a pre-filling pressure during a pre-filling phase, then the frictional shifting element can be changed to the desired extent to an operating condition necessary for its engagement.

During a filling equalization phase that comes after the pre-filling phase, if the frictional shifting element is acted upon by a filling equalization pressure such that at the end of the filling equalization phase the shifting element is in an operating condition with a transmission capacity that is at least approximately equal to zero, in which increasing the actuating pressure of the shifting element starting from the filling equalization pressure increases of the transmission capacity preferably more or less directly, then the frictional shifting element can be engaged in the necessary efficient manner and engagement processes can be carried out with reproducible quality.

If after the end of the filling equalization phase the actuating pressure of the frictional shifting element is increased along a pressure ramp, a starting process can be carried out with great driving comfort since the transmission capacity of the frictional shifting element can be changed with high resolution and therefore adapted to the current operating condition variation at the time.

In a further advantageous variant of the method according to the invention, the actuating pressure of the shifting element is increased along a further pressure ramp that follows the first pressure ramp, such that the gradient of the first pressure ramp is steeper than the gradient of the further pressure ramp and at the end of the further pressure ramp the shifting element is preferably in an at least approximately slip-free operating condition.

This ensures that the transmission capacity of the frictional shifting element can be increased to a desired value within short operating times, without giving rise to reaction torques in the vehicle drive-train that impair the driving comfort. This results from the fact that the transmission capacity of the frictional shifting element to begin with, i.e. when its value is low, is at first increased more rapidly whereas from a defined limit value above which higher torques can be transmitted by the frictional shifting element, a higher resolution is provided in the area of the frictional shifting element and torque fluctuations during a starting process occur to a lesser extent in the vehicle drive-train.

If, during an additional pressure ramp of the actuating pressure that comes after the further pressure ramp of the actuating pressure, the shifting element is brought to a fully closed operating condition in which the shifting element is acted upon with a closing pressure, then after reaching a slip-free operating condition the shifting element can be brought to its fully closed operating condition with high pressure gradients within short operating times and a required starting process can be carried out substantially without any delay.

When a starting command has been issued, if a further shifting element is prepared for engagement in the force flow by a pre-filling phase followed by a filling equalization phase, such that in the engaged operating condition of the further shifting element a first transmission range is preferably engaged in the transmission device, the further shifting element is prepared for engagement within defined operating times and, starting from a defined operating condition, it can be changed to a closed operating condition within reproducible times.

If the shifting element is a driving direction clutch by means of which a rotation direction for forward or reverse driving can be produced in the area of the drive output, the procedure according to the invention can be integrated with little effort into existing vehicle drive-train versions without having to change the design of the shifting element compared to existing concepts. Since it is particularly necessary in the case of working machines that so-termed reversing processes should be obtainable by means of driving direction clutches, during which processes by means of the driving direction clutch, the vehicle can be braked from a given speed in the forward or reverse driving direction, down to zero speed, and then accelerated again in the respective opposite driving direction up to a defined speed level, the loads in the area of the driving direction clutches during such reversing processes are very high. For that reason driving direction clutches are designed from the outset to be correspondingly robust. During the implementation according to the invention of a required starting process, the shifting element designed as a driving direction clutch is essentially loaded only half as severely as during a conventionally carried out reversing process of a working machine.

In advantageous variants of the method according to the invention the pre-filling phase of the further shifting element is started at the same time as, or before, or after the beginning of the pre-filling phase of the shifting element, so that independent of that, the further shifting element is changed under low load to the closed operating condition while the force flow in the vehicle drive-train is still interrupted, before the frictional shifting element is changed. Basically the aim is to change the vehicle drive-train to the operating condition required for the starting process commanded, within the shortest possible operating time. The time when the respective engagements of the further shifting element and of the frictional shifting element are started, depends among other things also on the design of the shifting elements.

For example, depending on the application case at the time, it is possible to begin the filling of the frictional shifting element before the filling of the further shifting element and to engage the further shifting element before the frictional shifting element, while with the further shifting element already closed, the frictional shifting element is brought to its closed operating condition in a modulated manner.

In a further advantageous variant of the method according to the invention, during the filling equalization phase of the frictional shifting element the transmission capacity of the further shifting element is increased along a pressure ramp of the actuating pressure of the further shifting element until the further shifting element is in a preferably slip-free operating condition. This ensures that during an interrupted force flow of the vehicle drive-train the further shifting element can be changed to an at least nearly engaged operating condition with low loading.

Starting from an at least approximately slip-free operating condition, if the transmission capacity of the further shifting element is changed during a further pressure ramp of its actuating pressure that comes after the first pressure ramp, whose gradient is steeper than that of the first pressure ramp, to a fully closed operating condition in which the further shifting element is acted upon with a closing pressure, then the further shifting element can be changed to its fully closed operating condition, with low loading in the area thereof, within a short operating time and preferably before the force flow is established in the vehicle drive-train.

In order to be able to start a vehicle in as jerk-free a manner as possible, in another advantageous variant of the method according to the invention, the further pressure ramp of the actuating pressure of the shifting element is started when the drive output rotational speed is above zero, since during the further pressure ramp the transmission capacity of the shifting element can be adjusted and varied with higher resolution to an extent necessary for that.

If the transmission ratio of the transmission device is increased until the drive output rotational speed is greater than zero and the transmission ratio of the transmission device is then kept at least approximately constant until the beginning of the additional pressure ramp of the actuating pressure of the shifting element, the starting process can be carried out within a short operating time and with a high level of driving comfort, since the transmission ratio required for starting is adjusted in an operating-condition-dependent manner and then kept constant in order to be able to engage the frictional shifting element with the most constant boundary conditions possible, with no disturbances and hence with delays as short as possible.

In a further advantageous variant of the method according to the invention, during the additional pressure ramp of the actuating pressure of the frictional shifting element the transmission ratio of the transmission device is increased farther so that the required vehicle speed can be reached within a shorter time.

the characteristics specified in the following example embodiment of the object of the invention, whether considered alone or in any combination with one another, are in each case suitable as further developments of the object of the invention. In relation to such further development of the object according to the invention, the respective combinations of characteristics do not have any restrictive force but are presented essentially only as examples.

BRIEF DESCRIPTION OF THE DRAWINGS

Further advantages and advantageous embodiments of the object according to the invention emerge from the example embodiment whose principle is described below with reference to the drawings, which show.

DETAILED DESCRIPTION OF THE PREFERRED EMBODIMENTS

Figure 1:
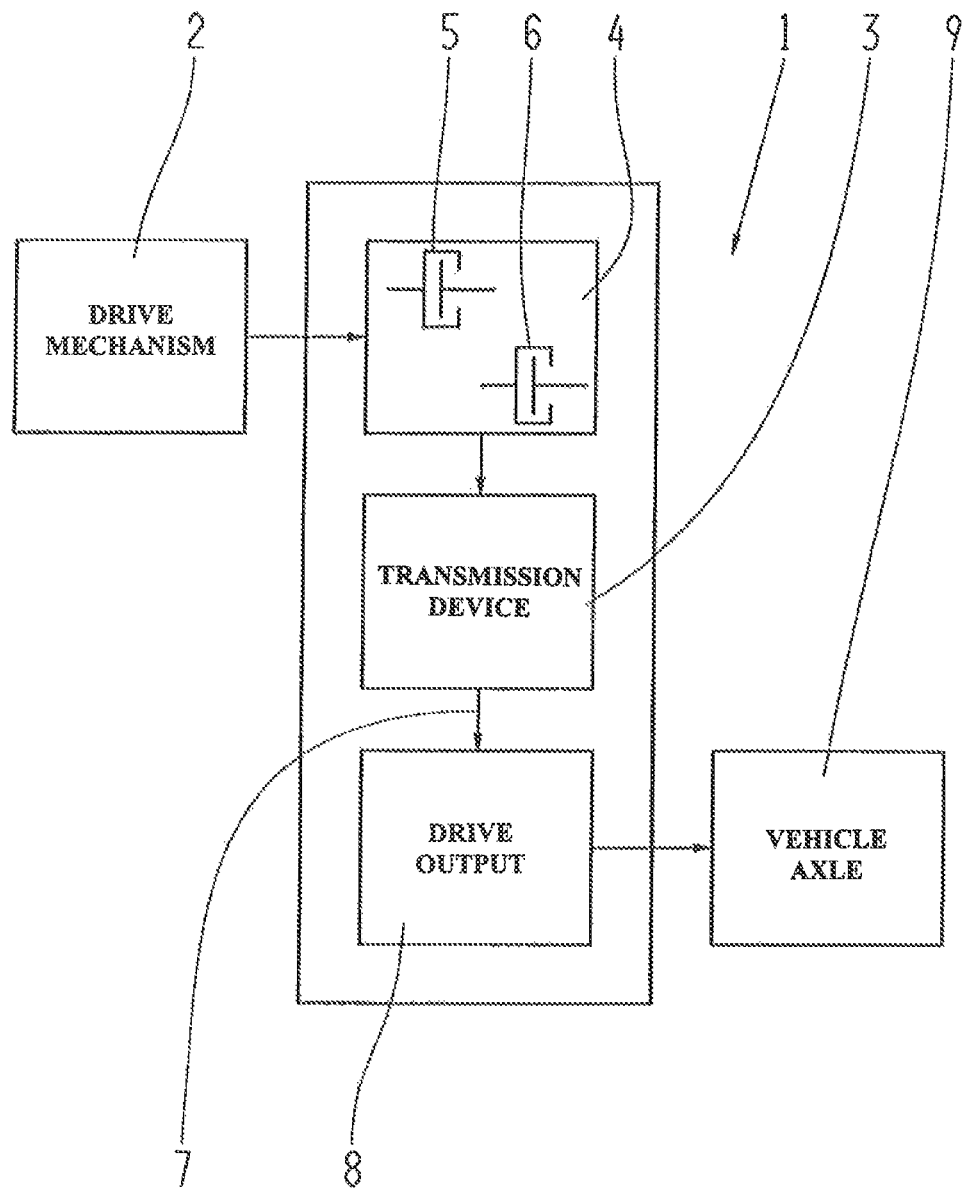
FIG. 1: A simplified representation of a vehicle drive-train with a drive mechanism, a continuously-variable power-branched transmission device that can be coupled thereto, and a drive output.

FIG. 1 shows a schematic representation of a vehicle drive-train 1 comprising a drive mechanism 2 and a continuously-variable power-branched transmission device 3 that can be coupled thereto. In this case the drive mechanism 2 is in the form of an internal combustion engine, preferably a diesel engine, but in other embodiments of the vehicle drive-train 1 it can also be in the form of an electric machine or a combination of an internal combustion engine of any type with an electric machine, In the present case, between the drive mechanism 2 and the transmission device 3 is provided a reversing gear system 4 which comprises two frictional shifting elements 5, 6, each of them designed as a driving direction clutch. When the frictional shifting element 5 is closed, drive rotational movement of the drive mechanism 2 is transmitted to the transmission device 3 with a rotational direction such that a vehicle constructed with the vehicle drive-train 1 is propelled in the forward driving direction. On the other hand, when the frictional shifting element 6 is closed and at the same time the frictional shifting element 5 is open, the drive rotational movement of the drive mechanism 2 is transmitted to the transmission device 3 with the opposite rotational direction and a vehicle constructed with the vehicle drive-train 1 will move in the reverse driving direction.

A shaft 7 of the transmission device 3 is functionally connected to a drive output 8 of the vehicle drive-train 1, by way of which a drivable vehicle axle 9 can be acted upon by torque. In the area of the continuously-variable power-branched transmission device 3, a plurality of transmission ratio ranges can be engaged, within each of which the transmission ratio of the transmission device 3 can be varied continuously by adjusting a variator. The transmission device 3 can be designed either as a primary or as a secondary coupled continuously-variable power-branched transmission, wherein the power branching can take place hydraulically, electrically, or by means of a combination thereof.

Instead of the reversing gear system 4, in the area between the drive mechanism 2 and the transmission device 3 the vehicle drive-train 1 can also be constructed with a conventional starting element such as a frictional starting clutch, and then when it is desired to drive the vehicle in reverse this can be done, for example, by means of a separate gear stage for reversing provided in the transmission device 3.

Regardless of whether the vehicle drive-train 1 is configured with the reversing gear system 4 or with an individual frictional starting clutch, a force flow between the drive mechanism 2 and the drive output 8 can be produced in the area of the frictional shifting element 5 or the frictional shifting element 6 or in the area of a frictional starting clutch by appropriately adjusting the transmission capacity of one of those shifting elements. When a starting command has been issued, in the area of the transmission device 3, a starting transmission ratio is set and a drive torque is transmitted in appropriately converted form by way of the transmission device 3, starting from the drive mechanism 2 toward the drive output 8 or the drivable vehicle axle 9 as soon as the force flow has been at least partially established.

Figure 2:
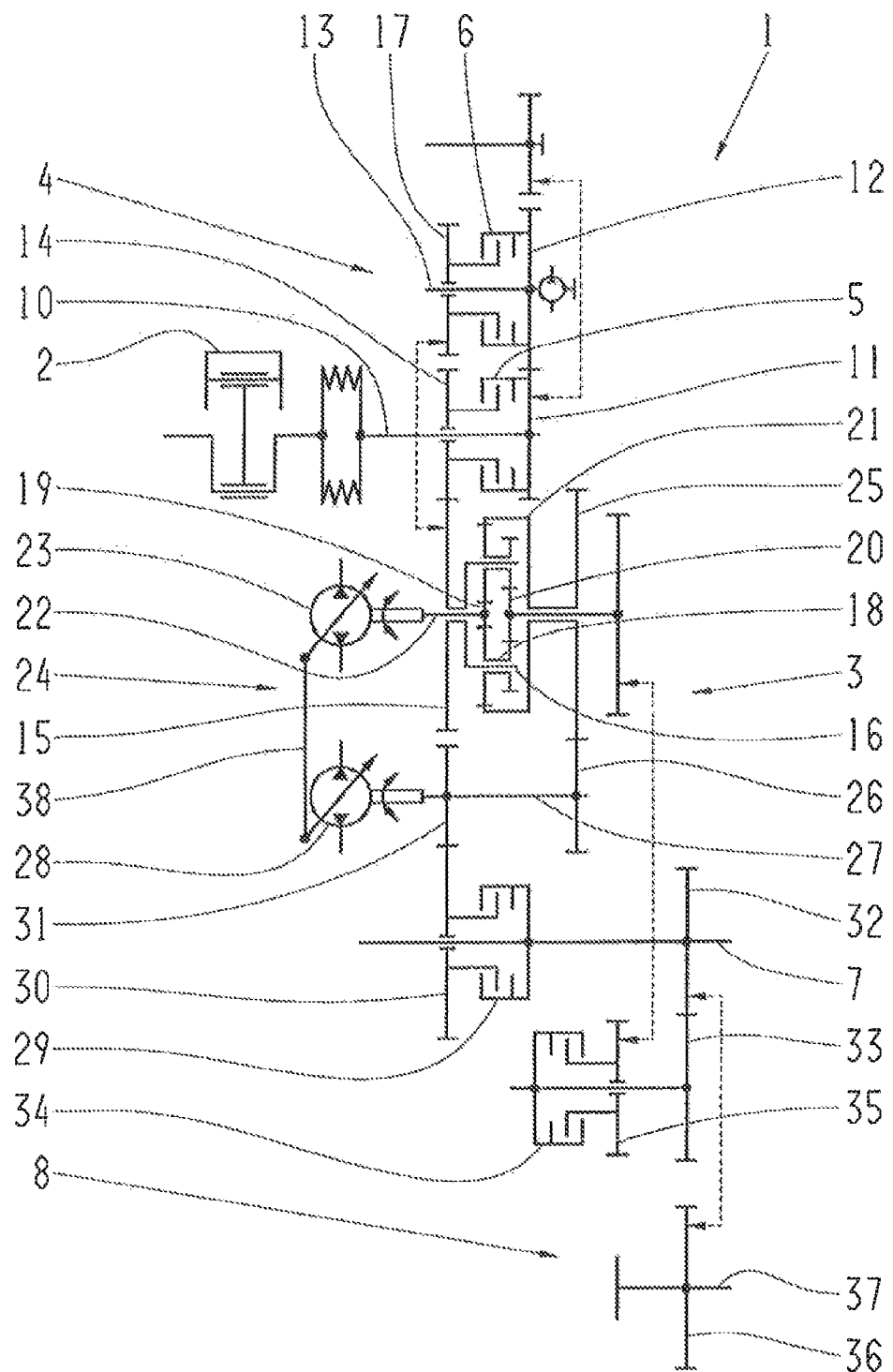
FIG. 2: A more detailed representation of a possible form of the vehicle drive-train shown in FIG. 1.

FIG. 2 shows a gearwheel layout of a possible embodiment of the transmission device 3, which is connected in a rotationally fixed manner, in the area of a transmission input shaft 10, to the drive mechanism 2. By way of a fixed wheel 11 and a fixed wheel 12, the transmission input shaft 10 drives an auxiliary drive output 13 and the first shifting element halves of the frictional shifting elements 5 and 6. The frictional shifting element 5 is arranged coaxially with the transmission input shaft 10 whereas the frictional shifting element 6 or driving direction clutch for reversing is positioned on the shaft of the auxiliary drive output 13, arranged coaxially with the transmission input shaft 10. In the closed operating condition of the frictional shifting element 5 or driving direction clutch for forward driving, by way of a loose wheel 14 mounted to rotate on the transmission input shaft 10 the transmission input shaft 10 drives a loose wheel 15 which is coupled in a rotationally fixed manner to a planetary carrier 16. In the closed operating condition of the frictional shifting element 6, the transmission input shaft 10 drives the loose wheel 15 via a loose wheel 17.

On the planetary carrier a plurality of double planetary gearwheels 18 are mounted to rotate. The double planetary gearwheels 18 engage with a first sun gear 19 and a second sun gear 20 and with a ring gear 21. The first sun gear 19 is connected in a rotationally fixed manner to a shaft 22 of a first hydraulic unit 23 of a hydrostatic unit 24. The ring gear 21 is functionally connected by way of a fixed wheel 25 and a fixed wheel 26 to a shaft 27 of a second hydraulic unit 28 of the hydrostatic unit 24.

The shaft 7 of the transmission unit 3 can be connected to the second shaft 27 of the hydrostatic unit 24 by means of a frictional shifting element 29 arranged coaxially with the shaft 7 for a first drive range of the transmission device 3, a loose wheel 30 and a fixed wheel 31. Moreover, the shaft 7 can be coupled to the second sun gear 20 by way of a fixed wheel 33 and a further frictional shifting element 34 for a second drive range of the transmission device 3 as well as a loose wheel 35 and a fixed wheel 36. The fixed wheel 36 is arranged coaxially with the second sun gear 20 whereas the fixed wheel 33, the frictional shifting element 34 for the second drive range and the loose wheel 35 are arranged coaxially with one another. For their part the fixed wheel 32, the frictional shifting element 29 for the first drive range and the loose wheel 30 are positioned coaxially with the shaft 7. In addition the fixed wheel 32 meshes both with the fixed wheel 33 and with a fixed wheel 36 of a transmission output shaft 37, which in turn can be connected to the drivable vehicle axle 9 or to a plurality of drivable vehicle axles 9 of the vehicle drive-train 1.

The driving direction clutches 5 and 6 are in this case in the form of wet clutches which are provided not only to produce the force flow between the drive mechanism 2 and the drive output 8, but which at the same time also determine the driving direction as described earlier. By virtue of their capacitative design the frictional shifting elements 5 and 6 of the vehicle drive-train 1 shown in FIG. 2 can also be used as starting elements. This is the case when, starting from a neutral operating condition of the transmission device 3 in which the shifting elements 29 and 34 are open, the driver engages a driving direction and at the same time actuates a gas pedal to indicate a desired speed. In the present case the frictional shifting elements 5 and 6 are designed such that by means of them, even a driving direction change or so-termed reversal process starting from higher driving speeds in the forward or reverse driving direction is possible.

During such a reversal process the vehicle speed, starting from its current value, is first reduced toward zero and for that purpose the transmission capacities of both the frictional shifting element 5 and the frictional shifting element 6 are adjusted appropriately. During the reversal process the two frictional shifting elements 5 and 6 are predominantly operated with slip. When the vehicle speed is substantially equal to zero, the transmission capacities of the two shifting elements 5 and 6 are adjusted so that the vehicle moves off in the direction opposite to its previous driving direction, until the required vehicle speed has been reached.

Figure 3:
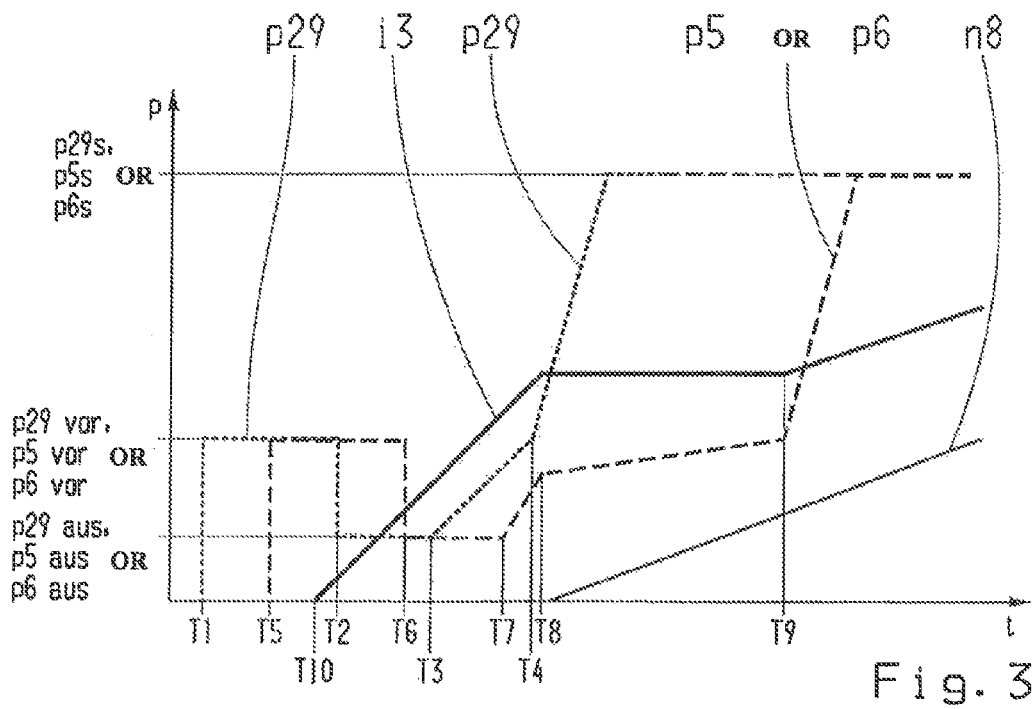
FIG. 3: A number of variations of operating parameters of various assemblies of the vehicle drive-train shown in FIGS. 1 and 2, as a function of time t.

In order to be able to carry out a starting process, beginning when the vehicle is at rest and the transmission device 3 is in its neutral operating condition, within short operating times and substantially without delays, the shifting element 29 for the first transmission ratio range of the transmission device 3 is closed and in addition, depending on whether at the time the driver wishes to drive forward or in reverse, the shifting element 5 or else 6 is changed to its closed operating condition. During the engagement of the shifting element 29 and the shifting element 5 or 6, the two hydraulic units 23 and 28 are adjusted by means of an adjustable yoke 38 in such manner that in the area of the transmission device 3 the desired starting transmission ratio is engaged. For this, during the setting of the starting transmission ratio of the transmission device 3, the transmission capacity of the frictional shifting element 5 or 6 is adjusted to values greater than zero in order to start a vehicle made with the vehicle drive-train 1 of FIG. 2 during the closing process of the frictional shifting element 5 or 6. To ensure this, the shifting element 29 and the shifting element 5 or 6 are acted upon by hydraulic pressure in the manner described in more detail below, with reference to FIG. 3.

At a time T1, starting with the vehicle at rest and with the transmission device 3 initially in its neutral operating condition, the driver commands a start of the vehicle made with the vehicle drive-train 1 of FIG. 1 or FIG. 2. Accordingly, from the time T1 until a time T2 the shifting element 29 is acted upon by a rapid-filling pulse such that the actuating pressure p29 of the shifting element 29 corresponds to a pre-filling pressure value p29vor. At time T2 a filling equalization phase of the shifting element 29 begins and the actuating pressure p29 of the shifting element 29 falls to a filling equalization pressure p29aus and is kept at that pressure level until a time T3. At time T3 the shifting element 29 is in an operating condition in which its transmission capacity is essentially zero, starting from which an increase of the actuating pressure p29 results in a direct increase of the transmission capacity of the shifting element 29.

Accordingly, starting at time T3 the actuating pressure p29 is increased along a pressure ramp with a defined gradient, which ends at a time T4. At time T4 the shifting element 29 is in an essentially slip-free operating condition, so along a further pressure ramp that comes after the first pressure ramp but has a steeper gradient, the actuating pressure p29 is increased farther toward a closing pressure p29s at which the shifting element 29 is fully closed.

At a time T5 after the time T1 but before T2, depending on the driving direction required either the frictional shifting element 5 or the frictional shifting element 6 is also acted upon by a rapid-filling pulse until a time T6, so that an actuating pressure p5 or p6 of the shifting element 5 or 6 reaches a pre-filling level p5vor or p6vor, respectively, during that time interval. At time T6 the actuating pressure p5 or p6 of the shifting element 5 or 6 is reduced to the level of a filling equalization pressure p5aus or p6aus and then kept at that pressure level until the end of the filling equalization phase.

At a time T7 the frictional shifting element 5 or 6 still has a transmission capacity equal to zero, but a further increase of the actuating pressure p5 or p6 immediately raises the transmission capacity to values greater than zero. Since at the end of the filling equalization phase or from the time T7 the actuating pressure p5 or p6 is increased along a pressure ramp, so too does the transmission capacity of the shifting element 5 or 6 increase. From a time T8 the actuating pressure p5 or p6 is increased farther with a smaller gradient, until the shifting element 5 or 6 reaches an essentially slip-free operating condition. In the present case this happens at a time T9, so from time T9 the actuating pressure p5 or p6 is increased with a steep gradient toward the closing pressure level p5s or p6s of the shifting element 5 or 6 within a short operating time t.

To be able to carry out the driver's command for the starting process of a vehicle made with the vehicle drive-train 1 shown in FIG. 1 or 2, in the desired manner as free from delays as possible, from a time T10 between times T5 and T2 a transmission ratio i3 of the transmission device 3 is increased steadily until a time T8 and then left constant at the transmission ratio value reached at time T8 until the time T9. From time T9 the transmission ratio i3 of the transmission device 3 is increased farther by correspondingly adjusting the hydrostatic unit 24, which constitutes the variator of the transmission device 3, with a smaller gradient than between the times T10 and T8, in order to be able to bring the vehicle's speed up to the value required by the driver.

Figure 4:
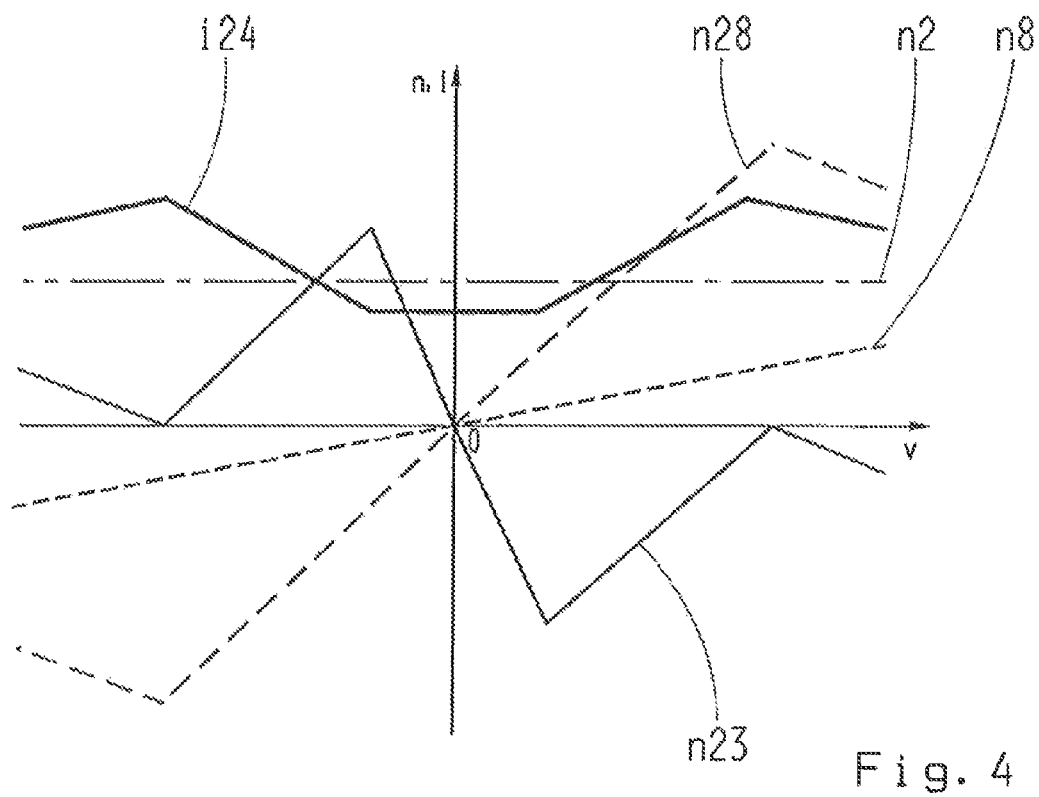
FIG. 4: A number of variations of operating parameters of various assemblies of the vehicle drive-train shown in FIGS. 1 and 2, as a function of the speed v of the vehicle.

FIG. 4 shows a number of rotational speed variations and a variation of a transmission ratio i24 as functions of the vehicle's speed, which are obtained in each case during a reversal process of the vehicle drive-train 1 starting from a forward driving direction or from a reverse driving direction, respectively to a reverse or forward driving direction. Beginning with the vehicle at rest, if during a starting process of the vehicle the drive-train 1 of the vehicle is operated in the forward or in the reverse driving direction by virtue of the procedure according to the invention described earlier, then the respective variations shown in FIG. 4 are obtained by analogy with the reversing process staring from a vehicle speed equal to zero in the direction toward positive or negative values.

Beginning with a vehicle speed v equal to zero, at which a rotational speed n8 of the drive output 8 is also zero and the transmission ratio i24, which in the present case is equal to the quotient of the rotational speed n28 of the second hydraulic unit 28 and the rotational speed n2 of the drive mechanism 2, has a value that corresponds to the quotient, when a starting process in the forward driving direction is commanded the drive output rotational speed n8 increases steadily while at the same time the speed n2 of the drive mechanism 2 remains constant in the manner shown in detail in FIG. 4, while the respective rotational speeds n23 and n28 of the first and second hydraulic units 23 and 28 are increased by engaging the shifting elements 29 and 5.

If a starting process in the reversing direction is commanded, the speed n8 of the drive output 8 increases quantitatively by the same amount as in the previously considered starting process in the forward driving direction, but with a negative sign, while compared with the starting process in the forward direction the rotational speeds n23 and n28 each increase, but again with the sign reversed.

INDEXES

1 Vehicle drive-train
2 Drive mechanism
3 Transmission device
4 Reversing gear system
5 Frictional shifting element
6 Frictional shifting element
7 Shaft
8 Drive output
9 Drivable vehicle axle
10 Transmission input shaft
11 Fixed wheel
12 Fixed wheel
13 Auxiliary drive output
14 Loose wheel
15 Loose wheel
16 Planetary carrier
17 Loose wheel
18 Double planetary gearwheels
19 First sun gear
20 Second sun gear
21 Ring gear
22 Shaft
23 First hydraulic unit
24 Hydrostatic unit
25 Fixed wheel
26 Fixed wheel
27 Shaft
28 Second hydraulic unit
29 Frictional shifting element
30 Loose wheel
31 Fixed wheel
32 Fixed wheel
33 Fixed wheel
34 Frictional shifting element
35 Loose wheel
36 Fixed wheel
37 Transmission output shaft
38 Adjustable yoke
i3 Transmission ratio of the transmission device
i24 Transmission ratio
n2 Rotational speed of the drive mechanism
n8 Rotational speed of the drive output
n23 Rotational speed of the first hydraulic unit
n28 Rotational speed of the second hydraulic unit
p5, p6 Actuating pressure
p29 Actuation pressure
v Vehicle speed
t Time
T1 to T10 Discrete time points

The invention claimed is:

1. A method of operating a vehicle drive-train (1) during a starting process, the drive-train comprising a drive mechanism (2) to which is couplable a continuously-variable power-branched transmission device (3), in which a plurality of transmission ratio ranges are engagable, transmission ratios can be varied continuously within the plurality of transmission ratio ranges by adjusting a variator (24), and the drive-train (1) also comprises a drive output (8), the method comprising the steps of:

producing a force flow in a frictional shifting element (5, 6), between the drive mechanism (2) and the drive output (8), by adjusting a transmission capacity of the frictional shifting element (5, 6), and the frictional shifting element (5, 6) comprises a driving direction clutch;

engaging a starting transmission ratio in the transmission device (3) when a start command is issued;

adjusting the transmission capacity of the frictional shifting element (5, 6) to a value greater than zero during the engagement of the starting transmission ratio;

when the start command is issued, preparing a further shifting element (29), during a pre-filling phase of the frictional shifting element (5, 6), for engagement in the force flow, and during an engaged operating condition of the further shifting element (29), a first transmission ratio range is engaged in the transmission device (3); and starting a pre-filling phase of the further shifting element (29) after the start command is issued but before beginning of the pre-filling phase of the frictional shifting element (5, 6).

2. The method according to claim 1, further comprising a step of adjusting the variator (24), during a starting process, to vary the transmission ratio of the transmission device (3) and a drive torque of the drive mechanism (2) applied at the frictional shifting element (5, 6) to an extent that reduces a loading of the frictional shifting element (5, 6).

3. The method according to claim 1, further comprising a step of producing a rotation direction, for either forward driving or reverse driving, in the drive output (8) with the frictional shifting element (5, 6).

4. The method according to claim 1, further comprising a step of, during a filling equalization phase of the frictional shifting element (5, 6), increasing a transmission capacity of the further shifting element (29) along a first pressure ramp of an actuating pressure (p29) of the further shifting element (29), until the further shifting element (29) is in an at least substantially slip-free operating condition.

5. The method according to claim 4, further comprising a step of starting from the at least substantially slip-free operating condition, during a further pressure ramp of an actuating pressure (p29) of the further shifting element (29) that comes after the first pressure ramp, a gradient of which is steeper than a gradient of the first pressure ramp, bringing a transmission capacity of the further shifting element (29) to a fully engaged operating condition in which the further shifting element (29) is acted upon by an engaging pressure (p29s).

6. The method according to claim 1, further comprising a step of pre-filling the frictional shifting element (5, 6) during the pre-filling phase of the frictional shifting element (5, 6) by applying a pre-filling pressure (p5vor, p6vor) when the start command is issued.

7. The method according to claim 6, further comprising a step of, during a filling equalization phase of the frictional shifting element (5, 6) that comes after the pre-filling phase of the frictional shifting element (5, 6), acting upon the frictional shifting element (5, 6) with a filling equalization pressure (p5aus, p6aus), and, at an end of the filling equalization phase of the frictional shifting element (5, 6), the frictional shifting element (5, 6) is in an operating condition in which the transmission capacity of the frictional shifting element (5, 6) is at least approximately equal to zero, in which operating condition an increase of an actuating pressure (p5, p6) of the frictional shifting element (5, 6), starting from the filling equalization pressure (p5aus, p6aus), brings about an increase of the transmission capacity.

8. The method according to claim 7, further comprising a step of, after an end of the filling equalization phase of the frictional shifting element (5, 6), increasing the actuating pressure (p5, p6) of the frictional shifting element (5, 6) along a first pressure ramp.

9. The method according to claim 8, further comprising a step of increasing the actuating pressure (p5, p6) of the frictional shifting element (5, 6) farther along a further pressure ramp that comes after the first pressure ramp, a gradient of the first pressure ramp being steeper than a gradient of the further pressure ramp, and at an end of the further pressure ramp, the frictional shifting element (5, 6) is in an at least substantially slip-free operating condition.

10. The method according to claim 9, further comprising a step of, during an additional pressure ramp of the actuating pressure (p5, p6) of the frictional shifting element (5, 6) that comes after the further pressure ramp of the actuating pressure (p5, p6) of the frictional shifting element (5, 6), bringing the frictional shifting element (5, 6) to a fully engaged operating condition in which the frictional shifting element (5, 6) is acted upon by an engaging pressure (p5s, p6s), 11. The method according to claim 9, further comprising a step of starting the further pressure ramp of the actuating pressure (p5, p6) of the frictional shifting element (5, 6) when a drive output rotational speed (n8) is greater than zero.

12. The method according to claim 11, further comprising a step of increasing a transmission ratio (i3) of the transmission device (3) until the drive output rotational speed (n8) is greater than zero, and thereafter keeping the transmission ratio of the transmission device (3) substantially constant until a beginning of an additional pressure ramp of the actuating pressure (p5, p6) of the frictional shifting element (5, 6).

13. The method according to claim 12, further comprising a step of further increasing the transmission ratio (i3) of the transmission device (3) during the additional pressure ramp of the actuating pressure (p5, p6) of the frictional shifting element (5, 6).

14. A method of operating a vehicle drive-train during a starting process of a vehicle, the vehicle drive-train having a drive mechanism that is connectable to a continuously-variable power-branched transmission device in which a plurality of transmission ratios are engagable, the method comprising the steps of:
  adjusting a torque transmission capacity of a frictional shifting element to implement a force flow from the drive mechanism, via the frictional shifting element, to a drive output, the frictional shifting element (5, 6) being a driving direction clutch;
  engaging a starting transmission ratio in the transmission device when a start command is issued;
  adjusting the torque transmission capacity of the frictional shifting element to values greater than zero while engaging the starting transmission ratio;
  when the start command is issued:
    first, starting a pre-filling phase of a further shifting element (29); then
    second, starting a pre-filling phase of the frictional shifting element (5, 6); then
    third, finishing the pre-filling phase of the further shifting element (29) and starting a filling equalization phase of the further shifting element (29); then and
    fourth, finishing the pre-filling phase of the frictional shifting element (5, 6) and starting a filling equalization phase of the frictional shifting element (5, 6); and
  adjusting a variator to continuously vary the plurality of transmission ratios in the transmission device.

15. The method according to claim 14, wherein in an engaged operating condition of the further shifting element (29), a first transmission ratio range is engaged in the transmission device (3).

16. The method according to claim 14, further comprising a step of controlling a respective actuating pressure of each shifting element (5, 6, 29), during a respective pre-filling phase, to be less than a respective actuating pressure of each shifting element (5, 6, 29) during a respective filling equalization phase.

17. The method according to claim 14, further comprising a step of locating the frictional shifting element (5, 6) between the drive mechanism and the variator; and
  the variator comprises first and second hydraulic units (23, 28), and adjusting the first and second hydraulic units (23, 28) together via an adjustable yoke (38).

18. The method according to claim 14, further comprising steps of causing the frictional shifting element (5, 6) and the further shifting element (29) to both be in an open and disengaged operating condition when the starting command is issued; and
  having the vehicle at rest when the starting command is issued.

19. The method according to claim 14, further comprising a step of after starting the pre-filling phase of the frictional shifting element (5, 6) but before finishing the pre-filling phase of the further shifting element (29), increasing the transmission ratio of the transmission device with a constant slope until a rotation speed of the drive output becomes greater than zero.

20. The method according to claim 19, further comprising a step of after the rotation speed of the drive output is greater than zero, holding the transmission ratio of the transmission device constant until the frictional shifting element (5, 6) reaches an substantially slip-free operating condition.

* * * * *